United States Patent
Assadi et al.

(10) Patent No.: US 8,828,486 B2
(45) Date of Patent: Sep. 9, 2014

(54) METHOD FOR MANUFACTURING DIAMOND

(71) Applicants: Hamid Assadi, Düsseldorf (DE); Frank Gärtner, Hamburg (DE); Thomas Klassen, Wentorf (DE); Peter Heinrich, Germering (DE); Heinrich Kreye, Hamburg (DE); Werner Krömmer, Landshut (DE)

(72) Inventors: Hamid Assadi, Düsseldorf (DE); Frank Gärtner, Hamburg (DE); Thomas Klassen, Wentorf (DE); Peter Heinrich, Germering (DE); Heinrich Kreye, Hamburg (DE); Werner Krömmer, Landshut (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 13/855,944

(22) Filed: Apr. 3, 2013

(65) Prior Publication Data
US 2014/0127415 A1    May 8, 2014

(30) Foreign Application Priority Data

Apr. 5, 2012   (DE) ............ 10 2012 006 995
Jul. 12, 2012  (EP) ................... 12005146

(51) Int. Cl.
*B05D 1/12*    (2006.01)
*C01B 31/06*   (2006.01)

(52) U.S. Cl.
CPC .. *B05D 1/12* (2013.01); *C01B 31/06* (2013.01)
USPC ............ 427/189; 427/201; 427/427

(58) Field of Classification Search
None
See application file for complete search history.

(56) References Cited

U.S. PATENT DOCUMENTS 3,663,788 A  *  5/1972  Inoue ................. 219/76.13
7,758,916 B2 *  7/2010  Schmid et al. ............ 427/191

FOREIGN PATENT DOCUMENTS

| DE | 196 24 694 A1 | 1/1998 |
| DE | 10 2004 034667 A1 | 2/2006 |
| JP | 6 048715 A | 2/1994 |
| JP | 6 272044 A | 9/1994 |

OTHER PUBLICATIONS

Goswami R et al., "Diamond synthesis by high-velocity thermal spray . . . ", Journal of Materials Research, Jan. 1, 2000, pp. 1, 6-8, Bd. 15, Nr. 1, Materials Research Society,US.
Shin et al., "The influence of process parameters on deposition characteristics . . . ",Applied Surface Science, Feb. 1, 2008, pp. 1-5, 9, Bd. 254, Nr.8.
Na H et al., "Advanced deposition characteristics of kinetic sprayed . . . ", Composites Science and Technology, Mar 1, 2009, pp. 3-4, Bd. 69, Nr. 3-4, Elsevier, UK.

* cited by examiner

*Primary Examiner* — Frederick Parker
(74) *Attorney, Agent, or Firm* — Philip H. Von Neida

(57) ABSTRACT

A method for manufacturing diamond or diamond-like carbon (DLC) by converting at least one other form of carbon such as graphite, amorphous carbon, fullerenes, glass carbon, graphene, carbon foam or a mixture of these forms. This method comprises an acceleration of particles and causing them to collide with a substrate. The particles and/or the substrate contain(s) or consist(s) of one other form of carbon. The conversion is induced by impact of the particles with the substrate, wherein cold gas spraying is used to advantage.

11 Claims, 2 Drawing Sheets

METHOD FOR MANUFACTURING DIAMOND

CROSS REFERENCE TO RELATED APPLICATIONS

The subject application claims priority from German Patent Application DE 102012006995.2 filed on Apr. 5, 2012 and European Patent Application EP 12005146.1, filed Jul. 12, 2012.

BACKGROUND OF THE INVENTION

The invention relates to a method for manufacturing diamond or diamond-like material from a form of carbon such as graphite.

The synthesis of diamond from graphite or C60 (fullerenes) requires the action of a high pressure on the graphite. Static methods are known for this on the one hand but also dynamic methods on the other hand.

In the static methods, graphite is compressed at a high temperature for a long period of time. Under standard conditions, the conversion of graphite to polycrystalline diamond begins at pressures above 12 GPa (1 GPa=10 kbar) and temperatures in the range of 2700° C. (Bundy, 1962, J. Chem. Phys.). In order for the conversion to take place more rapidly, one may even use a pressure of approximately 15 GPa and 3000° C. These ranges are complex and expensive to achieve industrially. However, with the help of metallic catalysts (usually a metal melt), the reaction conditions may be lowered to approx. 1500° C. and 6 GPa, which is thus a more realistic order of magnitude from the standpoint of efficiency.

The group of dynamic methods requires much lower temperatures in comparison with the static methods.

One known example of a dynamic method for diamond synthesis is the conversion of graphite by compacting the graphite with the help of explosive shockwaves (Decarli and Jamieson, 1961, Science). The resulting diamond created by high pressure cools off so rapidly that the characteristic diamond structure is obtained even at room temperature. The conversion of graphite to diamond also involves a martensite-like conversion, which requires only a few nanoseconds (Erskine and Nellis, 1991, Nature).

According to another dynamic method, the high pressure for the conversion is created by cavitation in an ultrasonic bath. The graphite here is in an organic solution at room temperature. The disadvantage of this method for commercial use is that typically a diamond yield of only 1% to 2% has been achieved in laboratory experiments so far.

The object of the present invention is to provide an efficient method for manufacturing diamond or diamond-like carbon, hereinafter also referred to as DLC (diamond-like carbon) from another form of carbon.

SUMMARY OF THE INVENTION

This object is achieved by a method for manufacturing diamond or diamond-like carbon by converting at least one other form of carbon selected from the group consisting of graphite, amorphous carbon, fullerenes, glass carbon, graphene, activated carbon, carbon nanotubes, carbon foam and a mixture of these forms, characterized in that the method comprises acceleration of particles and causing them to collide with a substrate, wherein the particles and/or the substrate comprise the other form of carbon, wherein the conversion is induced by impact of the particles with the substrate, and wherein the particles are accelerated to a velocity of at least 1500 meters per second until their impact with the substrate.

In the method according to the invention, diamond or DLC is created by conversion of at least one other form of carbon (i.e., a form other than diamond). Examples of such other forms include graphite, amorphous carbon (C60), fullerenes, glass carbon, graphene, activated carbon, carbon nanotubes, carbon foam or a mixture of these forms. This method includes a step of accelerating the particles and causing the particles to collide with a substrate.

The particles and/or the substrate contain(s) or consist(s) of at least one other form of carbon. For example, so-called run-in materials (abradables) are used in particular. These are composite materials consisting of a metallic component and graphite, or cast iron may be used as the material for the particles and/or substrate, e.g., gray cast iron containing up to 4 wt % carbon which is distributed in the iron in lamellar form in the form of lamellar graphite.

In embodiments in which particles containing at least one other form of carbon are used, the particles may consist of an agglomerate of graphite with a metal, with a metal alloy and/or with a ceramic material, for example. Alternatively or additionally, particles of ceramics and/or metal coated with the other forms of carbon (e.g., with graphite) may also be used.

Particle compositions in which one component consists of a high-density material are advantageous. Then the impact pressure can be increased. Mixtures of another form of carbon (e.g., graphite) with metal or metals or metal alloys are advantageous in particular, but metals or metal alloys with a high density are especially preferred here.

Various mixed particles of the types mentioned above may also be used.

The acceleration of the particles is so great that their impact with the substrate causes the other form of carbon (in particles and/or substrate) to be converted into diamond or diamond-like carbon (DLC).

The collision of particles with the substrate results in the crystal lattice of the other form(s) of carbon being converted into from one structure into another by a shearing process. Such conversions do not require any thermal support but instead require only high stresses which propagate at the speed of sound in the crystal lattice. The new crystal lattice is formed due to the shift in the individual atoms by an amount which is less than the distance from the neighboring atom. In the present case, the crystal lattice of the other form of carbon is deformed by this impact into a diamond structure or a diamond-like structure.

The converted diamond material may adhere to the substrate in a layer or may be contained in a powder that falls away from the substrate.

If a substrate containing at least one other form of carbon is used, this may be present in a surface, for example, and may be converted into diamond or diamond-like carbon (DLC) by the direct impact of the particles. Alternatively, the substrate may comprise a film or a thin sheet beneath which there is a layer with the other form(s) of carbon. In manufacturing the diamond or diamond-like carbon in this embodiment, the particles strike the film and/or sheet, which transfers the pressure, thereby generated onto the carbon layer and thus causes its conversion. This embodiment allows simple separation of the diamond material thereby created from the particles used, in particular preventing the particles from adhering as a layer to the diamond material. The film or thin sheet is preferably easy to remove from the material created, which contains diamond or diamond-like carbon (DLC).

The required speed to which the particles must be accelerated in order for conversion to take place depends on the size and density of the particles and the temperature of the material to be converted (i.e., the other form in particles and/or substrate). It can be determined with the help of a Hugoniot curve. Depending on the temperature, speeds between 1500 and 1600 meters per second are usually especially suitable (Savinyik et al., 2009, Shock Compression of Condensed Matter).

The acceleration of the particles can be achieved in various ways. In one preferred embodiment of the present invention, this is accomplished by the cold gas spraying method.

Cold gas spraying is a thermal spraying method which is known for coating and for production of components in various fields of application. A powdered spray material is accelerated through a nozzle with an expanding process gas stream and is directed at a substrate. Spray particles with a diameter of 1 to 250 μm are generally used. It is usually less expensive to use larger particles than finer particles.

To increase efficiency, the process gas can be heated upstream from the nozzle. This makes it possible to influence both the particle velocity and the particle temperature at the moment of impact. The warmer the particle, the greater is the efficiency of cold gas spraying. Furthermore, denser layers with a greater strength can be sprayed using warmer particles. However, the temperature of the particles in cold gas spraying is not increased to such an extent that the particles melt before reaching the narrowest cross section of the nozzle.

With a suitable choice of the process parameters of gas pressure and gas temperature, the impinging particles will adhere to the substrate. However, this does not take place due to partial or complete melting but instead is the result of an intense plastic deformation on impact, which occurs so rapidly that the associated heat/warming is not deflected into the interior of the particles. This warming together with the pressure on impact causes the adhesion.

Collision speeds at which sufficiently high pressures for the conversion of carbon of another form into diamond or DLC can occur in cold gas spraying. According to one embodiment of the present invention, the pressure and temperature of the gas are suitably coordinated with one another so that a particle speed of at least 1500 m/s, preferably at least 1600 m/s is achieved. To do so, known results and models, which are achieved and/or developed by experimental and/or theoretical methods and which reflect the underlying functional dependencies of pressure, temperature and particle speed on one another under the given starting conditions for given particles, are used. Therefore, the use of cold gas spraying for production of diamond or DLC offers the advantage of a simple control because essentially only the pressure and temperature of the process gas must be controlled during production.

In the impact of particles in cold gas spraying, there is an extremely rapid deformation of the material, with deformation rates of up to $10^9$ $s^{-1}$ at pressures in the range of several GPa, and there is extremely rapid cooling of the areas of the workpiece heated by the deformation. The cooling rates are in the range of $10^9$ $Ks^{-1}$, i.e., 1 degree Kelvin per nanosecond. The rapid cooling of the heated contact zone of the particles ensures that the metastable structure of diamond or diamond-like carbon (DLC) is still present even after dissipation of the pressure and cooling to ambient temperature.

In one embodiment of the present invention, in which the particles are accelerated by cold gas spraying, helium or nitrogen is preferably used as the process gas. At least in the case when the particles used (i.e., not exclusively the substrate) contain the other form(s) of carbon, these gases are especially suitable for adjusting the pressure and temperature to one another in such way that the particles achieve a suitable velocity by their impact but on the other hand do not melt. Use of helium is especially preferred because higher particle velocities can be achieved when using helium at the same pressure and the same gas temperature in comparison with using nitrogen. If sufficiently high particle velocities are achieved when using nitrogen as the process gas, then it is also possible to use nitrogen, which is less expensive in comparison with helium.

One embodiment of the method according to the invention comprises a step of dissolving the diamond or diamond-like carbon thereby synthesized out of a mixture which also comprises another material (such as graphite), in addition to the diamond or diamond-like carbon. In cases in which the conversion of carbon of another form is incomplete (for example, due to the process conditions selected such as the particle or device features) it is possible to produce a diamond material or a diamond-like product that is at least approximately pure in this way.

Methods known from the production of diamond with the help of explosive techniques may be used for this separation. In this context, reference can be made to Japanese Patent Application JP 02-120220 A as an example.

One embodiment of the method comprises the creation of a surface layer on a workpiece which contains or consists of the diamond or diamond-like carbon. The workpiece may therefore be made especially abrasion-resistant in this way, for example.

As an alternative, the method for producing diamond or DLC may include its creation in the form of dust, powder, granules or an agglomerate. In particular, production of a mixture containing diamond or diamond-like carbon (DLC) at first and a subsequent separation of the material may be performed for the production of such forms of material. Dust, powder, granules or an agglomerate may be desired for various intended applications, for example, as an additive to polishing fluids or pastes or as a coating material for abrasives.

DETAILED DESCRIPTION OF THE INVENTION

Figure 1:
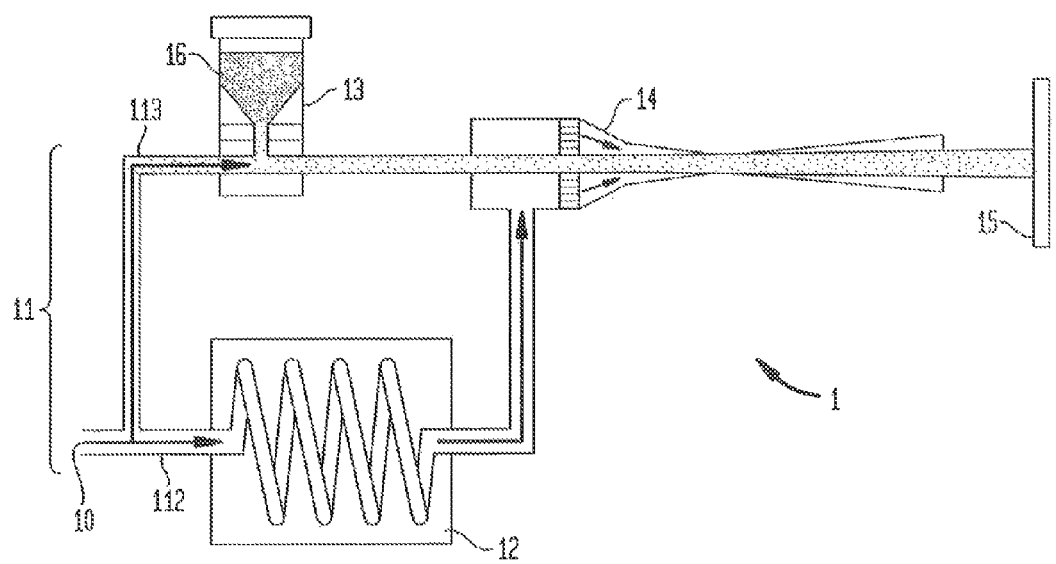
FIG. 1 shows as an example a device for cold gas spraying such as that which can be used for performing the method according to the invention.

FIG. 1 shows schematically a cold gas spray system 1, such as that used according to a preferred embodiment of the invention. The system comprises a gas line system 11, which is connected to a gas supply (not shown) for the process gas. One part 112 of the gas line system leads through a heating system 12, while another part 113 leads past a particle feed device 13, which contains the particles 16, for example, in the form of a powder or granules. The parts 112 and 113 of the gas line system converge in or in front of a nozzle 14, for example, a convergent-divergent Laval nozzle. This nozzle is directed at a substrate 15.

In the process sequence of cold gas spraying, process gas 10 is directed under pressure through the two parts 112 and 113 of the gas line system, where the gas is heated and/or enriched with particles from the particle feed device 13. The two gas streams are combined in or upstream from the nozzle 14 and are depressurized in the nozzle. The particles are accelerated with the gas stream, so that they strike the substrate 15 at a high velocity.

In the manufacture of diamond or DLC with the help of cold gas spraying, a form of carbon which is different from diamond, preferably graphite but also C60 (fullerenes) may be used as the substrate. Particle velocities of 1500 to 1600 meters per second can be achieved at the outlet of the nozzle, through a suitable choice of the gas pressure and gas temperature, depending on the respective parameters of the cold spray system (for example, the process gas used and/or the specific nozzle). As explained above, this can induce a conversion of the other form of carbon into diamond or diamond-like carbon.

Figure 2:
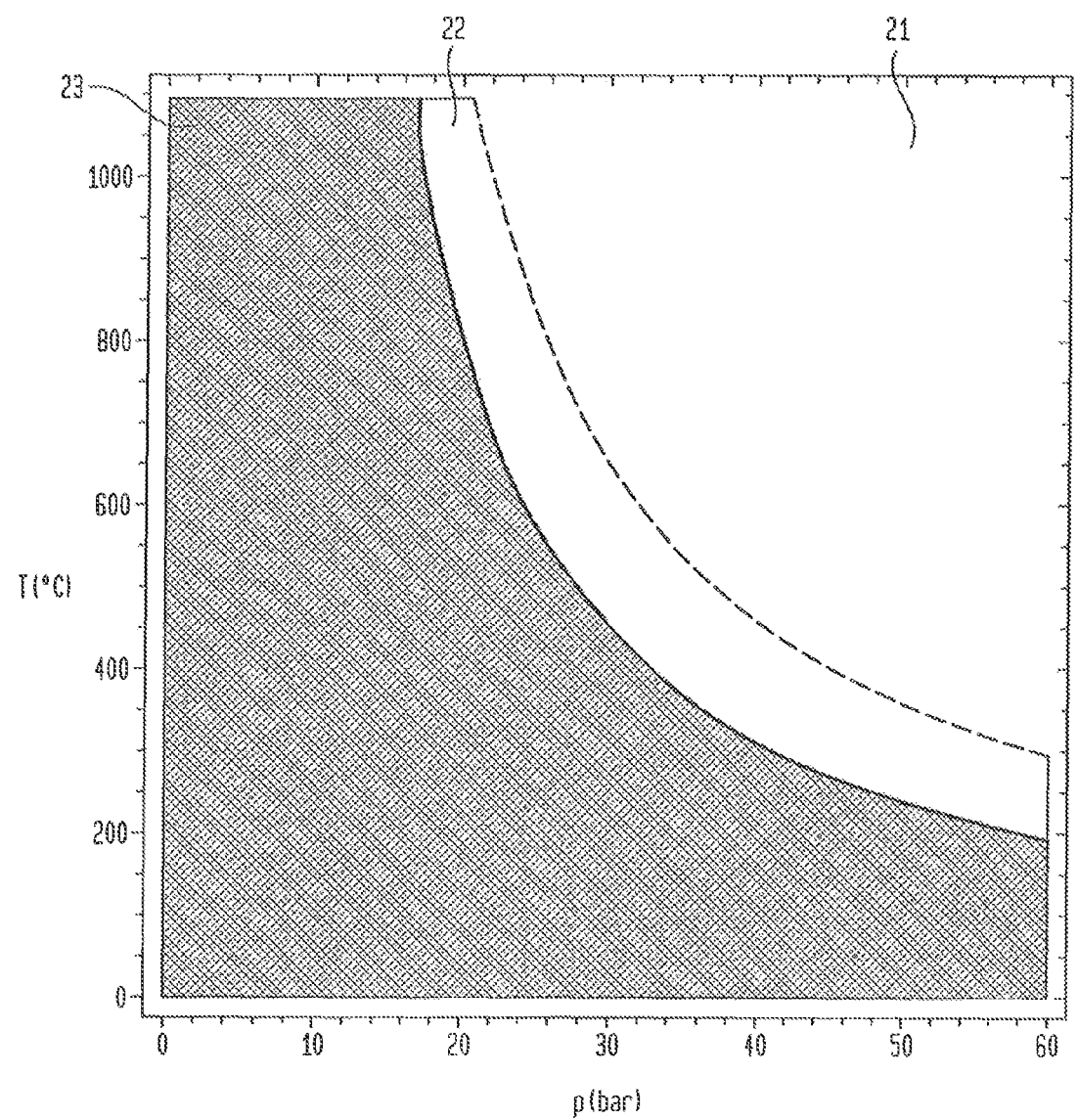
FIG. 2 shows a diagram from which it is possible to read temperature-pressure regions for which sufficiently high particle velocities are achieved under an exemplary combination of starting conditions.

FIG. 2 shows a possible two-dimensional definition range of a function which assigns a particle velocity to value pairs of temperature and pressure of the process gas in a cold gas spray system. The temperature is given in ° C. and the pressure is given in bar.

The method described by Assadi et al. (Assadi et al., 2011, J. Thermal Spray Technology) for a Kinetics 4000 spray system with a type D 51 nozzle was used in the calculation of the diagram, using graphite particles having a diameter of 20 μm and helium as the process gas.

The respective resulting function values are not shown explicitly and instead the regions 21 and 22 merely indicate whether these function values are large enough to create on impact a pressure sufficient to induce a conversion of graphite into diamond. This is the case in the first region 21, but this is not the case in the third region 23. The second region 22 is a transitional region which characterizes the conditions under which the particles are accelerated to 1500 to 1600 m/s. This is the velocity of the particles at the outlet of the nozzle.

LIST OF REFERENCE NUMERALS 1 cold spray system
10 process gas
11 gas line system
112 heated part of the gas line system
12 heating system
113 part of the gas line system with a particle inlet
13 particle feed device
14 nozzle
15 substrate
16 Particle
21 first region of a gas temperature-gas pressure range
22 second region of a gas temperature-gas pressure range
23 third region of a gas temperature-gas pressure range

What we claimed is:

1. A method for manufacturing diamond or diamond-like carbon by converting at least one other form of carbon selected from the group consisting of graphite, amorphous carbon, fullerenes, glass carbon, graphene, activated carbon, carbon nanotubes, carbon foam and a mixture of these forms, characterized in that the method comprises acceleration of particles and causing the particles to collide with a substrate, wherein the particles and/or the substrate comprise the at least one other form of carbon selected from the group consisting of graphite, amorphous carbon, fullerenes, glass carbon, graphene, activated carbon, carbon nanotubes, carbon foam and a mixture of these forms, wherein the converting is induced by impact of the particles with the substrate, and wherein the particles are accelerated to a velocity of at least 1500 meters per second until their impact with the substrate.

2. The method according to claim 1, wherein the particles are accelerated to a velocity of at least 1600 meters per second.

3. The method according to claim 1, wherein the acceleration of particles is accomplished by cold gas spraying.

4. The method according to claim 3, wherein a gas selected from the group consisting of helium, nitrogen and a mixture of helium and nitrogen is used as a process gas in the cold gas spraying.

5. The method according to claim 1, further comprising a step in which the diamond or diamond-like carbon that is manufactured is separated from the particles.

6. The method according to claim 5 wherein the another material is graphite.

7. The method according to claim 1, wherein the diamond or diamond-like carbon that is manufactured is created in the form selected from the group consisting of a dust, a powder, granules and an agglomerate.

8. The method according to claim 1, wherein a surface layer is created on a workpiece.

9. The method according to claim 8 wherein the surface layer comprises the manufactured diamond or diamond-like carbon.

10. The method according to claim 1, wherein the particles and/or the substrate is a composite material which contains a metallic component and graphite.

11. The method according to claim 1, wherein the substrate comprises a film or a thin sheet, beneath which there is a layer containing at least one other form of carbon, wherein the particles strike the film or the thin sheet, which transfers the pressure thereof to the layer.

* * * * *